(12) United States Patent
Falck et al.

(10) Patent No.: US 6,292,729 B2
(45) Date of Patent: *Sep. 18, 2001

(54) VEHICLE FUNCTION MANAGEMENT SYSTEM

(75) Inventors: Peter Leslie Falck; Trent Lynn Goodnight, both of Waterloo; Stephen Paul Lang, New Hartford; Bruce Craig Newendorp, Cedar Falls; Michael Owen Youngblood, Cedar Falls; Carl Edwin Kittle, Cedar Falls, all of IA (US)

(73) Assignee: Deere & Company, Moline, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,080

(22) Filed: Apr. 14, 1999

(51) Int. Cl.$^7$ .................................................... G06F 7/70
(52) U.S. Cl. ................... 701/50; 701/23; 701/25; 172/2; 172/9; 37/414; 56/10.2 A; 56/10.2 D; 56/10.2 F; 700/87; 700/88; 434/64
(58) Field of Search .................................. 701/50, 23, 24, 701/27, 25; 222/1, 52, 23; 706/13, 14, 912, 905; 172/3, 7, 9, 25; 702/94, 105; 382/209, 181, 190, 155; 700/83, 55, 61, 250, 900, 260, 45, 86, 17, 283, 240; 434/62, 64, 65

(56) References Cited

U.S. PATENT DOCUMENTS

| | | | |
|---|---|---|---|
| 4,105,937 | * 8/1978 | Tuda et al. ............................ | 318/568 |
| 4,750,888 | * 6/1988 | Allard .................................... | 434/69 |
| 5,050,771 | * 9/1991 | Hanson et al. ............................ | 222/1 |
| 5,129,044 | * 7/1992 | Kashiwagi et al. . | |
| 5,274,557 | * 12/1993 | Moriya et al. ......................... | 701/50 |
| 5,359,517 | * 10/1994 | Moriya et al. ......................... | 701/50 |
| 5,528,843 | * 6/1996 | Rocke .................................... | 37/348 |
| 5,574,657 | * 11/1996 | Tofte et al. ........................... | 700/283 |
| 6,061,617 | * 5/2000 | Berger et al. ......................... | 701/50 |
| 6,064,933 | * 5/2000 | Rocke .................................... | 701/50 |
| 6,076,030 | * 6/2000 | Rowe .................................... | 701/50 |

* cited by examiner

Primary Examiner—Jacques H. Louis-Jacques

(57) ABSTRACT

A tractor includes various actuators or functions, such as a powershift transmission, a hitch and hitch control system, a PTO, a plurality of selective control valves, etc., all controlled by one or more control units in response to sensed parameters and operator manipulated control devices, such as switches, knobs and levers. A function management system includes a programmed control unit which has a learn/save mode which is operable while the vehicle is moving. During the learn/save mode the operator performs a sequence of manual manipulations of the operator control devices, and the control unit records and then stores information pertaining to the sequence of operations, together with information pertaining to the distances traveled by the tractor between operations. The control unit also has an execute or replay mode, operable in response to an operator command signal, wherein the control unit automatically performs the stored sequence of operations so that the sequence of operations is performed at the same distance intervals at which they were learned, regardless of the speed of the vehicle.

5 Claims, 4 Drawing Sheets

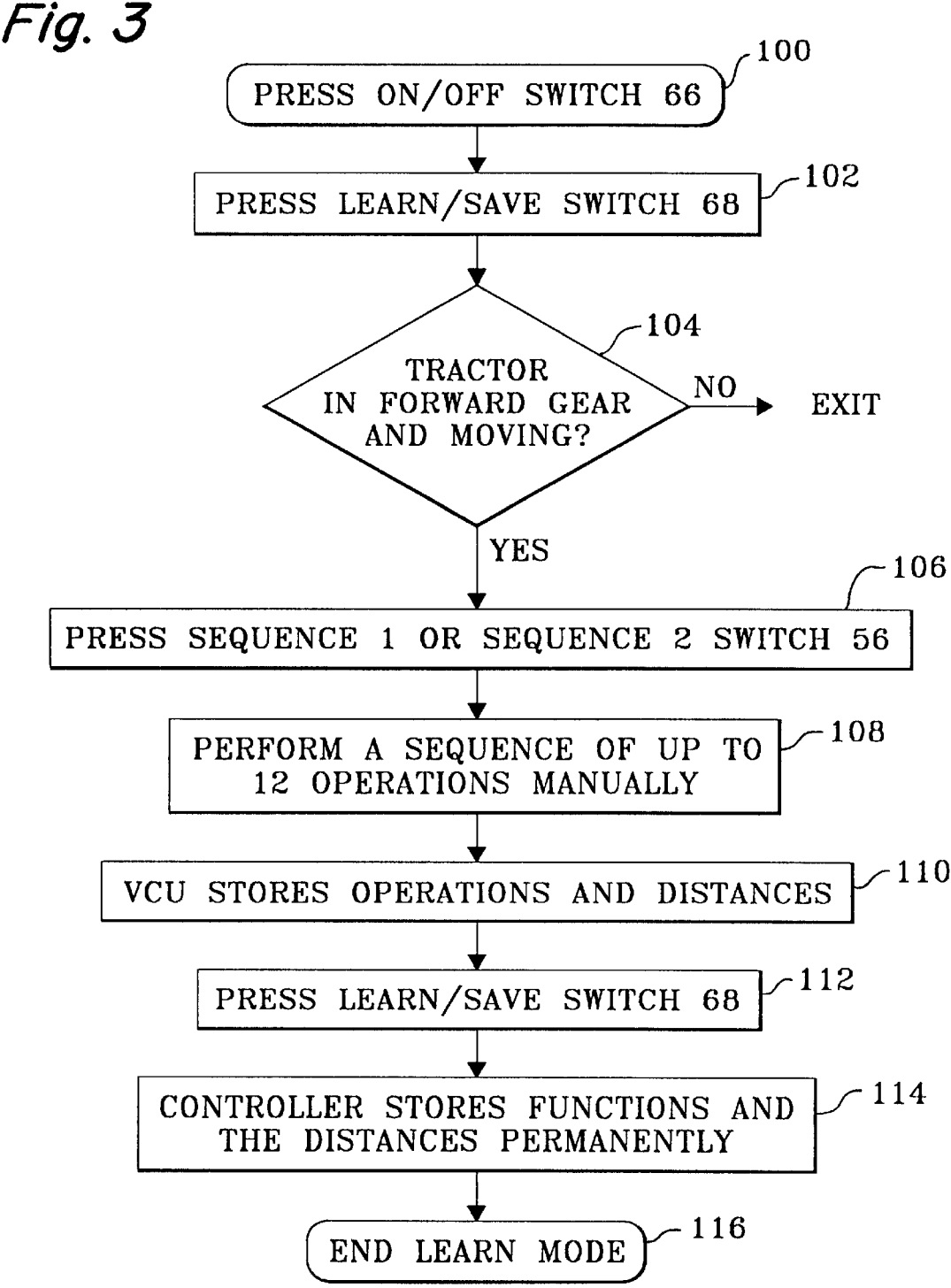

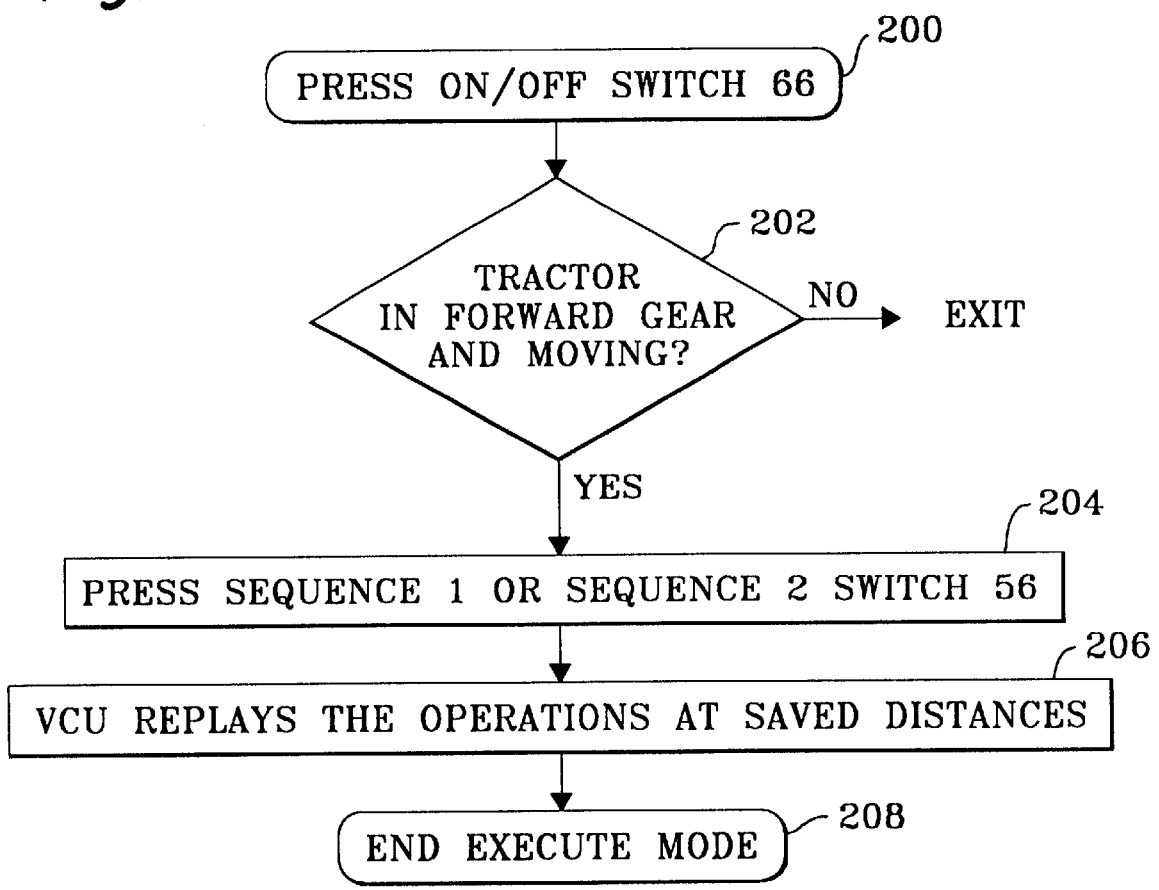

VEHICLE FUNCTION MANAGEMENT SYSTEM

BACKGROUND OF THE INVENTION

The invention relates to a system for managing or controlling functions as a vehicle moves over terrain, such as the various functions which must be controlled as an agricultural tractor moves through a field.

As an agricultural tractor moves through a field, the operator will typically be required to perform many operations at the start and at the end of a crop row in addition to simply steering the tractor, such as raising or lowering the implement hitch, shifting the transmission, engaging or disengaging the PTO shaft, etc. The number and complexity of the tasks can cause operator fatigue and can result in operational errors being committed. A system which can simplify the operator's tasks is desired.

SUMMARY OF THE INVENTION

Accordingly, an object of this invention is to provide a function management system which can simplify the tasks of an operator of a work vehicle, such as an agricultural tractor.

Another object of this invention is to provide a function management system which can learn and store various sequences of function operations, and execute or replay such learned sequences upon command.

A further object of the invention is to provide such a function management system wherein sequences of function operations are learned in correspondence with the distances traveled by the tractor between operations, so that the operational sequences can be automatically replayed with the same distance relationships therebetween as when they were learned.

These and other objects are achieved by the present invention, wherein a tractor includes various functional systems, such as a powershift transmission, a hitch and hitch control system, a PTO, a plurality of selective control valves, etc., all controlled by a control unit in response to sensed parameters and operator manipulated control devices, such as switches and levers. According to the present invention, the control unit has a Learn Mode which is operable while the vehicle is moving. During the learning mode the operator performs a sequence of manipulations of the operator control devices, and the control unit stores information pertaining to the sequence of operations, together with information pertaining to the distances traveled by the tractor between operations. The control unit also has an execute or replay mode wherein the control unit automatically performs the stored sequence of operations so that the sequence of operations is performed at the same distance intervals at which they were learned, regardless of the speed of the vehicle.

BRIEF DESCRIPTION OF THE DRAWINGS

FIG. 3 is a simplified logic flow diagram illustrating the operation of the learn/save mode of the present invention.

FIG. 4 is a simplified logic flow diagram illustrating the operation of the execution mode of the present invention.

DESCRIPTION OF THE PREFERRED EMBODIMENT

This application includes a microfiche appendix including one microfiche and 52 frames. A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

Figure 1:
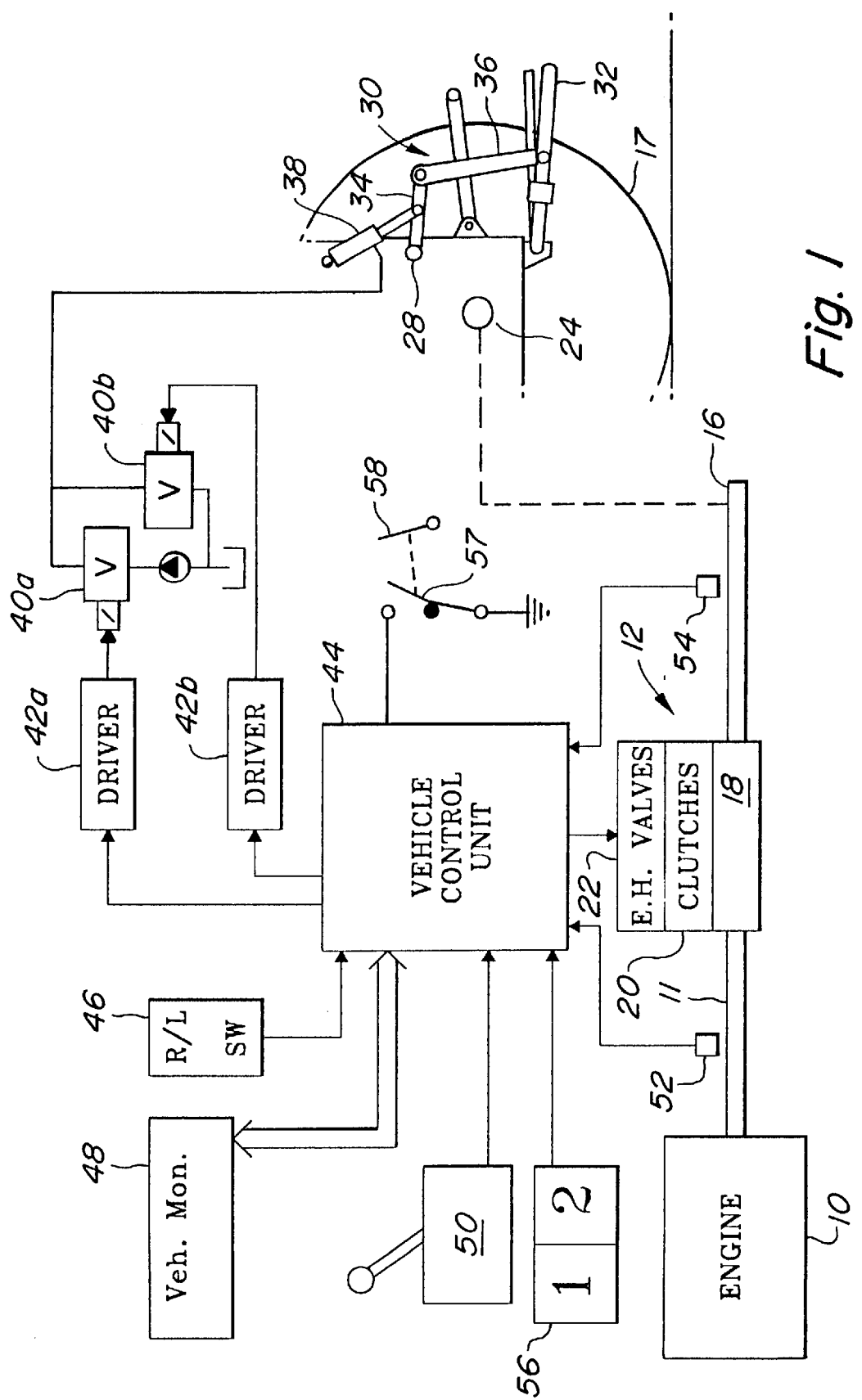
FIG. 1 is a schematic diagram of a vehicle function management system according to the present invention.

Referring to FIG. 1, a vehicle, such as a production John Deere 8000 series tractor, includes an engine 10 which drives an engine output shaft 11, which drives a power shift transmission (PST) 12, which drives an output drive shaft 16 which is connected to drive wheels 17. The PST 12 includes a transmission 18 which is operated by a set of pressure operated control elements or clutches 20 which are controlled by a corresponding set of solenoid operated proportional control valves 22. The PST may be a the PST available on the production John Deere 8000 Series tractor, or any electronically controlled transmission with similar operator controls. The valves 22 may be electrohydraulic valves, such as are also on the production John Deere 8000 Series tractor. The engine 10 also drives a conventional power take off (PTO) drive (not shown) via a PTO clutch (not shown), and drives a hydraulic pump (not shown) which supplies pressurized hydraulic fluid to selective control valves (not shown), all also as available on the production John Deere 8000 Series tractor. Such a tractor may also include a differential lock, a mechanical front wheel drive and electrohydraulic depth control cylinders (not shown) may be part of an implement (not shown) pulled by the tractor.

An implement hitch 30, such as a conventional 3-point hitch, includes draft links 32 which are connected to lift arms 34 via lift links 36. The lift arms 34 are connected to the rockshaft 28 to insure simultaneous and equal movement, and are raised and lowered via a pair of parallel connected hydraulic lift or rockshaft cylinders 38. The tractor portions and the hitch 30 are merely exemplary and those skilled in the art will understand that the invention can be applied to tractors and hitches of other configurations. As is well known, various ground-engaging implements (not shown), such as a moldboard plow or a chisel plow, may be attached in a conventional manner to the hitch 30.

The PST 12, the hitch 30, a PTO drive (not shown), selective control valves (not shown), a differential lock (not shown), a mechanical front wheel drive (not shown) and electro-hydraulic depth control cylinders (not shown) are examples of the various types of functions or actuators which may operated in desired sequences during operation of a tractor, such as at the start or end of a crop row.

The communication of hydraulic fluid to and from the cylinders 38 is controlled by a pair of solenoid-operated electro-hydraulic flow control valves 40a and 40b which are operated by drivers 42a and 42b which receive electrical control signals generated by a vehicle control unit (VCU) 44. The VCU 44 is preferably a microprocessor-based electronic control unit, such as is used on the production John Deere 8000 Series tractor. The flow control valves 40a and 40b and the drivers 42a and 42b could be such as is available on the production John Deere 8000 Series tractor. The VCU 44 also preferably controls a differential lock (not shown), a mechanical front-wheel drive clutch (not shown), the PTO (not shown), the SCVs (not shown), all such as is available on the production John Deere 8000 Series tractor.

VCU 44 receives signals from a spring centered, three-position rocker type hitch raise/lower switch 46, a vehicle monitor/display unit 48, and a shift lever unit 50, all such as is available on the production John Deere 8000 Series tractor. VCU 44 also receives signals from an engine speed sensor 52, preferably a mag pick-up, and an axle speed sensor 54, preferably a Hall effect sensor, which supplies an axle speed signal. Components 52 and 54 are preferably similar to their counterparts found on the production John Deere 8000 series tractors, but similar commercially available components could also suffice. VCU 44 also receives signals from a self-centering Sequence 1/Sequence 2 (Sequence) switch 56, preferably, a commercially available 3-position (1, 2 and neutral) momentary rocker switch which is used in connection with the present invention. The VCU 44, such as is available on the production John Deere 8000 Series tractor, includes input and output circuits, a programmed microprocessor and memory (not shown). VCU 44 also receives signals from a clutch switch 57 which is operatively connected to the clutch pedal 58.

Figure 2:
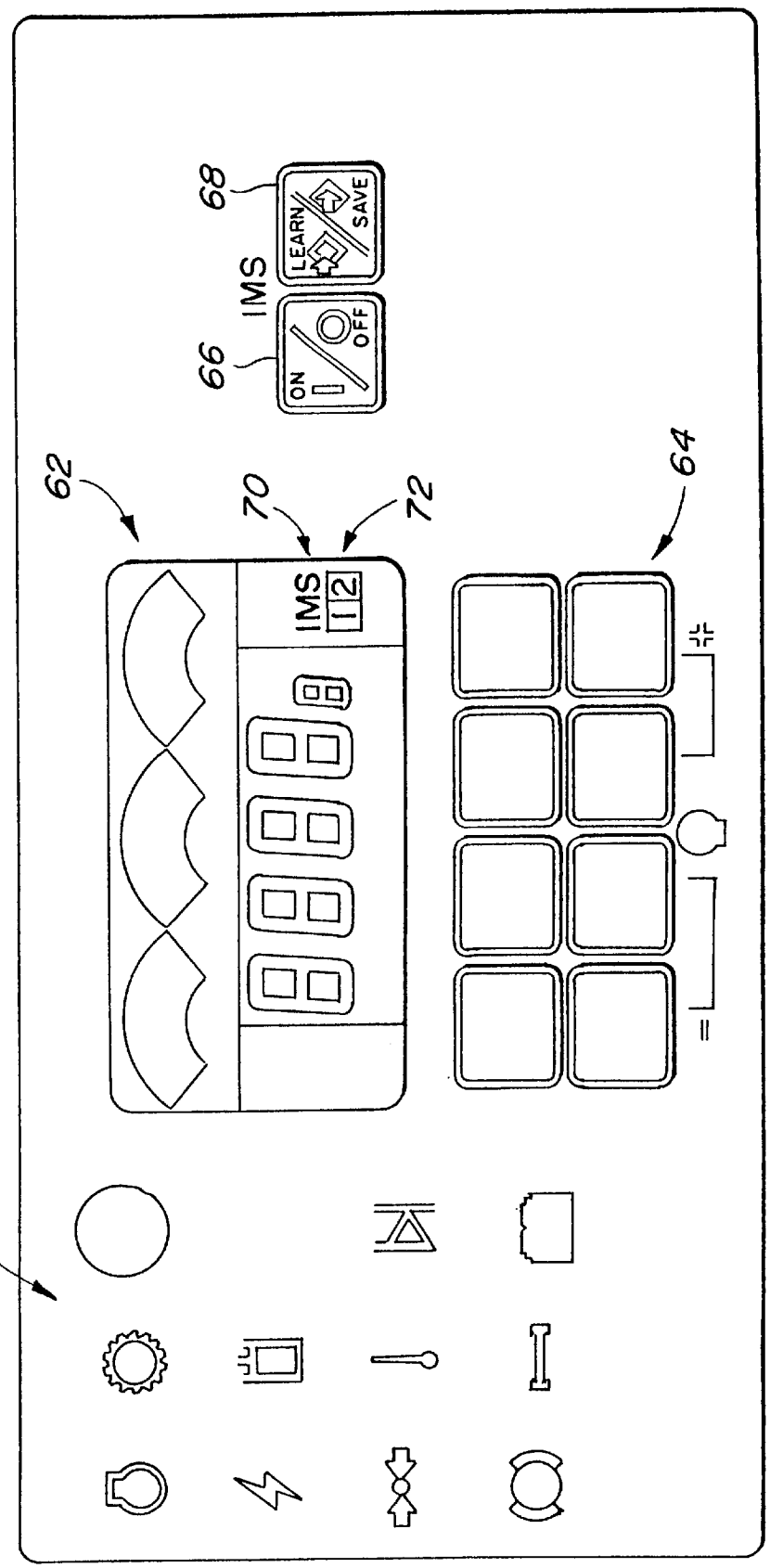
FIG. 2 is a view of the front panel or face of a vehicle monitor/display unit of FIG. 1.

Referring now to FIG. 2, the monitor/display unit 48 is similar to the monitor/display unit which is provided with the production John Deere 8000 series tractors, with some additions and or changes as will be described herein. The left-hand third of the monitor/display unit 48 includes a plurality of warning and status lights 60 associated with various vehicle functions, but which do not relate to the present invention. The upper portion of the middle part of unit 48 includes a graphic/numeric display 62. The lower portion of the middle part of unit 48 includes a plurality of touch pad switches 64 (also not involved with the present invention) which can be used to control what parameters are displayed by the numeric display portion of display 62. The upper and lower parts of the right-hand third of the monitor/display unit 48 includes touch pad switches (not shown) which do not relate to the present invention. The unit 48 also includes a speaker (not shown) which generates audible sounds in response to certain conditions and operations.

The middle part of the right-hand third of the monitor/display unit 48 includes touch pad On/Off switch 66 and a Learn/Save touch pad switch 68, both of which are used in connection with the function management system. The lower right-hand part of the display 62 includes an IMS (Implement Management System) display element 70 and a 1-2 sequence display element 72, both of which are lit up as a function of the operational status of the present invention, as will be described in more detail hereinafter.

To implement the present invention, the VCU 44 executes the program set forth in the attached microfiche appendix. Thus programmed, the VCU 44 derives distance information from the speed sensor 54, using well known integration techniques. The programmed VCU 44 cooperates with the elements shown in FIGS. 1 and 2 and thereby implements the function management system invention.

Referring to FIG. 3, the Learn Mode operates as follows. First, at step 100 the system is turned on by pressing the On/Off switch 66, and the IMS display indicator 70 turns on. Pressing Learn/Save switch 68 at step 102 activates the Learn/Save mode and the IMS indicator 70 will begin to flash and a beep will occur every 2 seconds. Step 104 allows the Learn/Save Mode to continue if the tractor in forward gear of the transmission 18 and is moving faster than a minimum speed, such as 0.5 km/h, for example. During Learn/Save mode, if the operator shifts the transmission 18 out of forward gear, the system will exit from and cancel the Learn/Save mode and the sequence will be cleared. At step 106 the operator momentarily toggles the Sequence switch 56 to its Sequence 1 or its Sequence 2 position, and the corresponding Sequence number of indicator 72 will begin to flash. Then as indicated at 108 the operator can perform a sequence of up to a maximum number (such as 12) of manually performed function operations, such as shifting the transmission 18 by manipulating the shift lever 50, or such as by raising and/or lowering the hitch 30 by manipulating the hitch raise/lower switch 46. As indicated at 110, the VCU 44 records (in a temporary memory location) all the manually performed operations together with the various distances traversed by the tractor between the various manually performed operations. Distances are calculated based on axle speed sensed by sensor 54 and are recorded with a resolution in millimeters. Distance information is recorded only when the tractor is in forward gear and is moving faster than the minimum speed. At step 112 the Learn/Save switch 68 is pressed again and as indicated by step 114, and the VCU stores in a permanent memory the sequence of operations and corresponding distances as either a sequence 1 or a sequence 2, depending on how the switch 56 was previously toggled. The Learn/Save mode then ends at 116 and the flashing sequence number 72 stops flashing and the IMS indicator 70 alone remains lit.

After one or two sequences of operations and distances has been learned and saved by the Learn/Save mode, the Execute Mode illustrated by FIG. 4 can be performed. At 200 the On/Off switch 66 is pressed to turn on the system and the IMS status indicator 70 turns on. Step 202 allows the Execute Mode to be performed if the tractor is in a forward gear of the transmission 18 and is moving faster than a minimum speed. Then, at 204, when the tractor reaches a location in a field at which the operator desires to execute a stored sequence of operations, the operator momentarily toggles Sequence switch 56 to its Sequence 1 or its Sequence 2 position to select which stored sequence will be replayed, and the corresponding "1" or "2" on display 72 is lit. The "1" or "2" sequence indicator 72 will remain on at least 3 seconds, even if the sequence being executed requires less than 3 seconds to be executed. Then, as indicated at 206 the VCU 44 automatically performs the selected sequence of stored operations, such as automatically shifting the transmission 18 without the operator manipulating the shift lever 50, or such as by automatically raising and/or lowering the hitch 30 without the operator manipulating the hitch raise/lower switch 46. These stored operations will be replayed with the same relative distances therebetween as when they were learned, regardless of whether or not the tractor is travelling at the same, slower or faster speed. At the completion of a sequence execution, the number 1 or 2 of display 72 will be turned off. The Execute Mode then ends at 208.

With two learned sequences and the system turned on, (and as long as the tractor is in a forward gear of the transmission 18 and is moving faster than a minimum speed), the operator may cause the first sequence to be automatically replayed by momentarily toggling the sequence switch 56 to its "1" position, for example, at the end of every crop row. Similarly, the operator may cause the second sequence to be automatically replayed by momentarily toggling the sequence switch 56 to its "2" position at the start of every crop row.

Thus, the function management system described herein can be used to automatically replay a sequence of operations at the start of every crop row with a single momentary actuation of sequence switch 56, and to automatically replay a different sequence of operations at the end of every crop row with a different single momentary actuation of switch 56. Because the function management system operates on the basis of distances traveled by the tractor (instead of on the basis of time intervals, the sequences can be "learned" slowly as the tractor is moving slowly, then automatically executed or replayed faster as the tractor moves at normal operating speeds. This allows the operator plenty of time to operate the "learn" mode and have the control unit 48 "learn" a complex sequence of operations.

During the operations described above, the invention also operates as follows. A beep will occur when the On/Off switch 66 is pressed. When the system is turned on the contents of the stored sequences will be displayed on the monitor/display 48. Each sequence, starting with sequence 1, will display each event that was learned and recorded every two seconds followed by the display of "End" on display 62.

Learned sequences are retained indefinitely. A maximum number, such as 12 operations can be recorded. The operator can delete a learned sequence from memory. If the Learn/Save mode is canceled during the learning process, i.e. the sequence was not concluded normally, then the sequence is cleared from memory. A saved sequence can be removed from memory by entering Learn/Save mode normally, selecting a sequence, and then hitting the Learn/Save switch 68 without operating any vehicle functions. This causes the system to exit the Learn/Save mode and discontinue flashing the sequence number indicator 72 while the "IMS" indicator 70 alone remains on.

Once the Learn/Save mode is completed, no operations can be added to the sequence. Distance information will be accumulated only while the tractor is in forward gear and above the minimum speed.

The Learn/Save mode may also be cancelled by hitting the On/Off switch 66 and, either a) not selecting a sequence with sequence switch 56 within 30 seconds, b) not learning any operations within 30 seconds of the time the sequence switch 56 is toggled, c) not actuating the Learn/Save switch 68 within 30 seconds of the first operation learned, d) shifting the transmission 18 out of a forward gear, or e) if the operator is not present and the tractor is not moving for more than 5 seconds.

The "IMS" status indicator 70 in the display 62 lights up when the system is on. If the On/Off switch 66 is pressed while function management system is on, then the system shuts off the function management system and turns off the IMS indicator 70. If the On/Off switch 66 is pressed and the Sequence switch 56 is not in the neutral position, then the function management system will not be turned on. If the system is in its Learn/Save mode when the function management system is turned off, then the Learn/Save mode will be cancelled and no sequence of operations will be saved. If the system is executing (replaying) a sequence when the function management system is turned off, the execution of the sequence will abort.

A beep will occur when the Learn/Save mode touch pad switch 68 is pressed. The "IMS" status indicator 70 on display 62 will flash during Learn mode and every two seconds the VCU 44 will generate a 16th of a second duration beep. If function management system is not on, pressing the Learn/Save switch 68 shall have no effect. If the Learn/Save switch 68 is pressed when the function management system is on, then the system shall enter into the Learn/Save mode.

If the function management system is off, pressing either part of the Sequence switch 56 will have no effect. If the function management system is on and the Sequence switch 56 transitions from the neutral position to either the Sequence 1 position or the Sequence 2 position, then the system will begin executing (replaying) the sequence. If the Sequence switch 56 is pressed while the Learn Mode is active, the system will begin learning subsequently manually performed operations.

Execution of a sequence will always begin at the first operation of the sequence, even if the sequence was previously aborted. During execution mode, the system will always command the learned operation for a function. If the function is already in the state which would result from performance of the learned operation, then the system will have no effect on that function. For example, if the operation is a raise the hitch operation, but the hitch is already fully raised, then execution merely passes along to the next operation of the sequence. If a sequence is already in process and then the sequence switch 56 is toggled for the corresponding sequence again, then that toggling of switch 56 will be ignored and the sequence execution will continue. If a sequence is already in process and then the sequence switch 56 is toggled for the other sequence, then the system will abort the execution of the sequence. If a function is disabled at the time a sequence is commanded then the system will not execute the sequence.

The operator can use the clutch pedal 58 to stop the system accumulating distance during a Learn/Save mode, and to temporarily pause the automatic performance of an operation during execution of a saved sequence. Once 30 seconds has expired, the sequence will abort regardless of whether the clutch is engaged or not. The system will also prevent execution of a sequence if the transmission gear is above a preselected maximum gear, such as 14 forward, unless the sequence was learned above that maximum gear.

If the operator manually operates a function during automatic sequence execution, then that manually operated function (under this function management system) will be inhibited for the remainder of the execution of the sequence. The other operations of the sequence will be performed as learned, and the particular manually operated operation will not be deleted from the learned sequence.

Alarm messages pertaining to functions, which are not included in the sequence being executed, shall not cause IMS to abort sequence execution.

While the present invention has been described in conjunction with a specific embodiment, it is understood that many alternatives, modifications and variations will be apparent to those skilled in the art in light of the foregoing description. For example, the function management system described herein can also be used to learn and replay operations involving the tractor differential lock, the mechanical front wheel drive, the power take-off (PTO), the selective control valves (SCVs) and any electrohydraulic depth control cylinders, such as on a towed implement and controlled by operator controls on the tractor. Accordingly, this invention is intended to embrace all such alternatives, modifications and variations which fall within the spirit and scope of the appended claims.

What is claimed is:

1. In a vehicle having a function which performs certain operations as the vehicle moves over terrain under the control of a control unit in response to manipulation of an operator control, a function management system comprising:

an operator actuatable learn/save switch connected to the control unit;

a learn mode implemented by the control unit, the learn mode being operable while the vehicle is moving, and wherein, in response to a manual sequence of manipulations of the operator control, the function performs a sequence of operations, and wherein the control unit stores information pertaining to the sequence of operations and stores information pertaining to distance intervals between said operations, with respect to the movement of the vehicle during the performance of said sequence of operations;

a replay mode implemented by the control unit, wherein the control unit automatically performs said stored sequence of operations and wherein the operations of said sequence are performed with distances intervals therebetween which are substantially the same as that which occurred during operation of the learn mode, regardless of the speed of the vehicle; and the control unit, in response to a first actuation of the learn/save switch, enabling a learn mode wherein the control unit records information pertaining to the manually performed sequence of operations, the control unit, in response to a second actuation of the learn/save switch after said sequence information is recorded, enabling a save mode wherein the control unit stores said information in permanent memory, and the control unit erasing a stored sequence from memory if the learn/save switch is actuated twice with no operations manually performed between said switch actuations.

2. In a vehicle having a function which performs certain operations as the vehicle moves over terrain under the control of a control unit in response to manipulation of an operator control, a function management system comprising:

a learn mode implemented by the control unit, the learn mode being operable while the vehicle is moving, and wherein, in response to a manual sequence of manipulations of the operator control, the function performs a sequence of operations, and wherein the control unit stores information pertaining to the sequence of operations and stores information pertaining to distance intervals between said operations, with respect to the movement of the vehicle during the performance of said sequence of operations;

a replay mode implemented by the control unit, wherein the control unit automatically performs said sequence of operations and wherein the operations of said sequence are performed with distances intervals therebetween which are substantially the same as that which occurred during operation of the learn mode, regardless of the speed of the vehicle; and an operator actuatable switch connected to the control unit and operatively coupled to a clutch pedal of the vehicle, the control unit stopping storing sequence information in response to an actuation of said switch.

3. In a vehicle having a function which performs certain operations as the vehicle moves over terrain under the control of a control unit in response to manipulation of an operator control, a function management system comprising:

a learn mode implemented by the control unit, the learn mode being operable while the vehicle is moving, and wherein, in response to a manual sequence of manipulations of the operator control, the function performs a sequence of operations, and wherein the control unit stores information pertaining to the sequence of operations and stores information pertaining to distance intervals between said operations, with respect to the movement of the vehicle during the performance of said sequence of operations;

a replay mode implemented by the control unit, wherein the control unit automatically performs said sequence of operations and wherein the operations of said sequence are performed with distances intervals therebetween which are substantially the same as that which occurred during operation of the learn mode, regardless of the speed of the vehicle; and an operator actuatable switch connected to the control unit and operatively coupled to a clutch pedal of the vehicle, the control unit stopping automatic performance of a sequence in response to an actuation of said switch.

4. In a vehicle having a function which performs certain operations as the vehicle moves over terrain under the control of a control unit in response to manipulation of an operator control, a function management system comprising:

a learn mode implemented by the control unit, the learn mode being operable while the vehicle is moving, and wherein, in response to a manual sequence of manipulations of the operator control, the function performs a sequence of operations, and wherein the control unit stores information pertaining to the sequence of operations and stores information pertaining to distance intervals between said operations, with respect to the movement of the vehicle during the performance of said sequence of operations; and a replay mode implemented by the control unit, wherein the control unit automatically performs said sequence of operations and wherein the operations of said sequence are performed with distances intervals therebetween which are substantially the same as that which occurred during operation of the learn mode, regardless of the speed of the vehicle;

a first operator actuatable switch connected to the control unit; and a second operator actuatable switch connected to the control unit and operatively coupled to a clutch pedal of the vehicle, the control unit, in response to a first actuation of the first switch, enabling a learn mode wherein the control unit records information pertaining to the manually performed sequence of operations, the control unit, in response to a second actuation of the first switch after said sequence information is recorded, enabling a save mode wherein the control unit stores said information in permanent memory, and the control unit stopping automatic performance of a sequence in response to an actuation of the second switch.

5. In a vehicle having function which performs operations as the vehicle moves over terrain under the control of a control unit in response to manipulation of operator controls, a function management system comprising:

a learn mode implemented by the control unit, the learn mode being operable while the vehicle is moving, and wherein, in response to a first manual sequence of manipulations of the operator controls, the functions perform a first sequence of operations, and wherein the control unit stores information pertaining to the first sequence of operations and stores information pertaining to distance intervals between said operations, with respect to the movement of the vehicle during the performance of said first sequence of operations, and in response to a second manual sequence of manipulations of the operator controls, the functions perform a second sequence of operations, and wherein the control unit stores information pertaining to the second sequence of operations and stores information pertaining to distance intervals between said operations, with respect the movement of the vehicle during the performance of said second sequence of operations;

a replay mode implemented by the control unit, wherein the control unit automatically performs a selected one of said sequences and wherein the operations of said sequence are performed with distances intervals therebetween which are substantially the same as that which occurred during operation of the learn mode, regardless of the speed of the vehicle; and a manually operable sequence selection switch coupled to the control unit, the control unit replaying a selected one of the operational sequences depending upon the status of the sequence selection switch, the control unit aborts execution of a learned sequence if the sequence selection switch is toggled a non-selected sequence while a selected sequence is being executed.

* * * * *